United States Patent
Talonn et al.

[15] 3,653,374
[45] Apr. 4, 1972

[54] SPIROMETER

[72] Inventors: Daniel A. Talonn, University City; Marvin D. Stumpf, St. Louis, both of Mo.

[73] Assignee: Sherwood Medical Industries Inc.

[22] Filed: Dec. 17, 1969

[21] Appl. No.: 885,758

[52] U.S. Cl. ................................. 128/2.08, 346/72
[51] Int. Cl. ........................................... A61b 5/08
[58] Field of Search .............. 128/2.08, 2.07; 346/72, 136, 346/61, 72

[56] References Cited

UNITED STATES PATENTS

| | | | |
|---|---|---|---|
| 3,363,260 | 1/1968 | Garbe | 128/2.08 |
| 2,259,139 | 10/1941 | Oesinghaus | 346/136 |
| 3,082,970 | 3/1963 | Rasmussen | 346/136 X |
| 3,160,464 | 12/1964 | Suter et al. | 346/72 |
| 3,388,404 | 6/1968 | Bush | 346/61 X |
| 2,999,495 | 9/1961 | Shipley | 128/2.08 |
| 1,863,929 | 6/1932 | McKesson | 128/2.07 |
| 2,228,983 | 1/1941 | Bloomheart | 128/2.07 |
| 3,512,521 | 5/1970 | Jones | 128/2.08 |
| 3,086,515 | 4/1963 | Jones | 128/2.08 |

*Primary Examiner*—Richard A. Gaudet
*Assistant Examiner*—Kyle L. Howell
*Attorney*—Donald S. Olexa, Jerome M. Teplitz, John G. Heimovics, William G. Lawler, Jr. and Hofgren, Wegner, Allen, Stellman & McCord

[57] ABSTRACT

A spirometer of the bellows type having a frame that releasably holds a pivotal bellows assembly carrying a vertically movable stylus that impresses a tracing on a spirogram record carried by a translating carriage assembly adjacent the stylus, with the spirogram being traced on one side of a pressure sensitive record permitting viewing of the tracing from the other side as it is being recorded. Ease of removal of the bellows permits rapid cleaning of the bellows while the pivoted bellows mounting permits use of a curved recording surface resulting in use of a linear chart. The chart is readily insertable into a self-centering chart holder which accurately aligns the chart ready for receiving a spirogram record.

17 Claims, 12 Drawing Figures

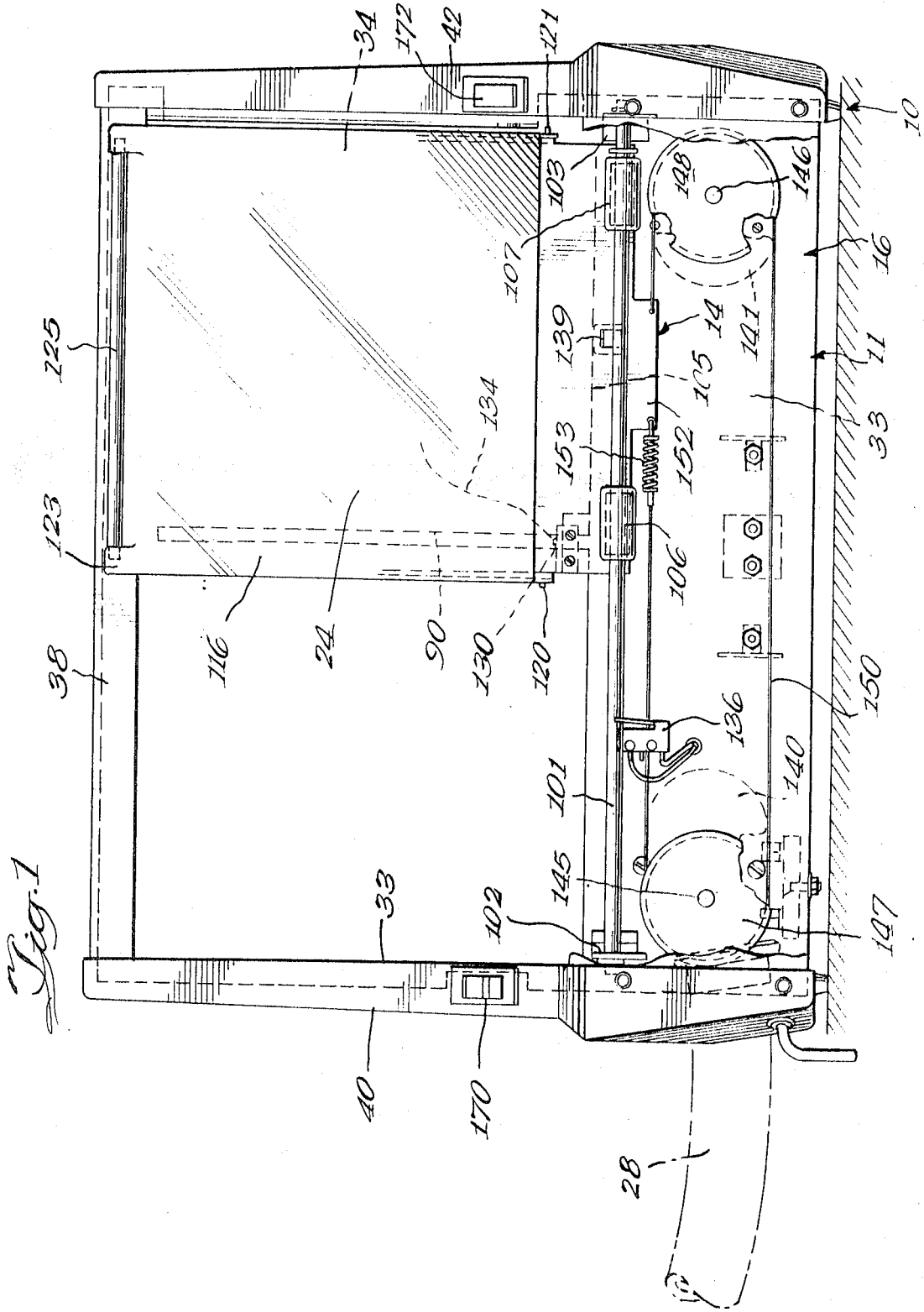

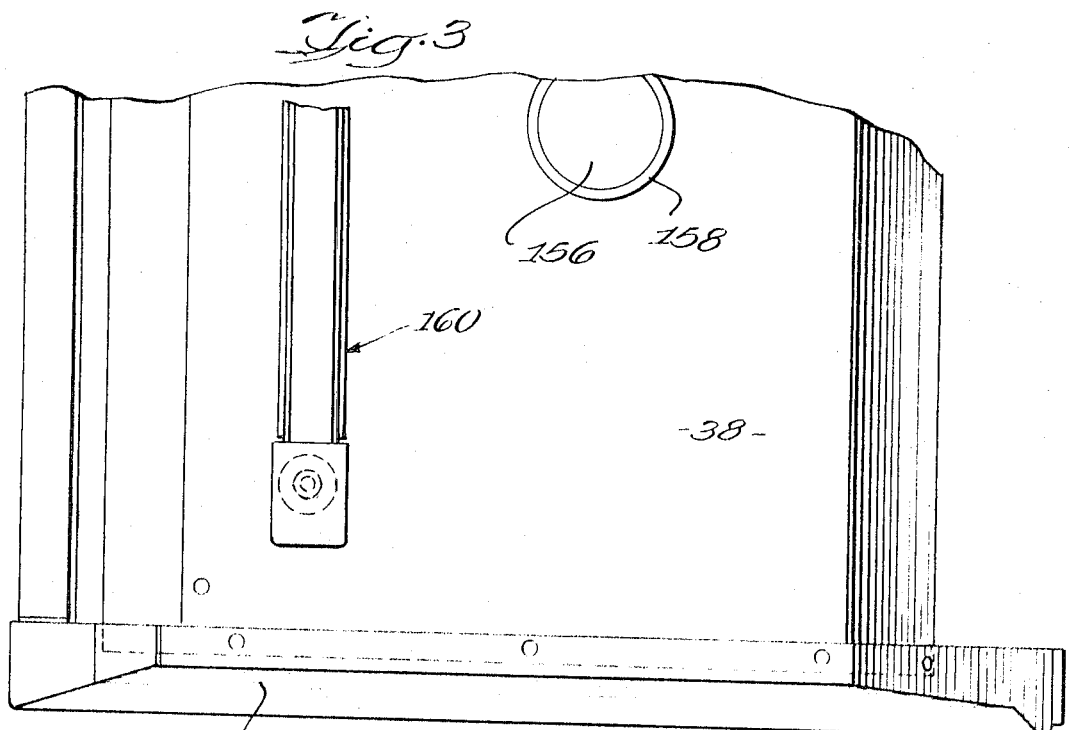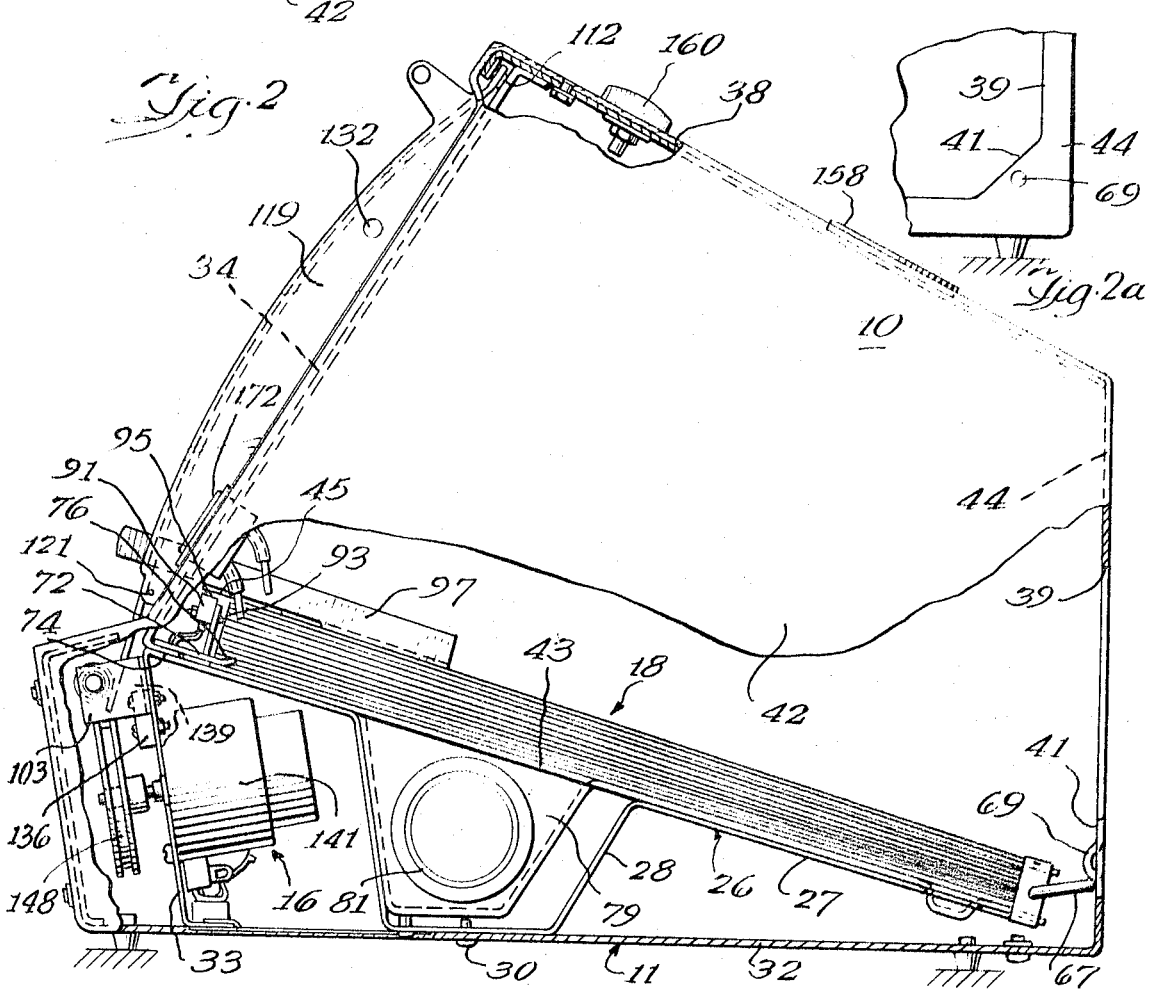

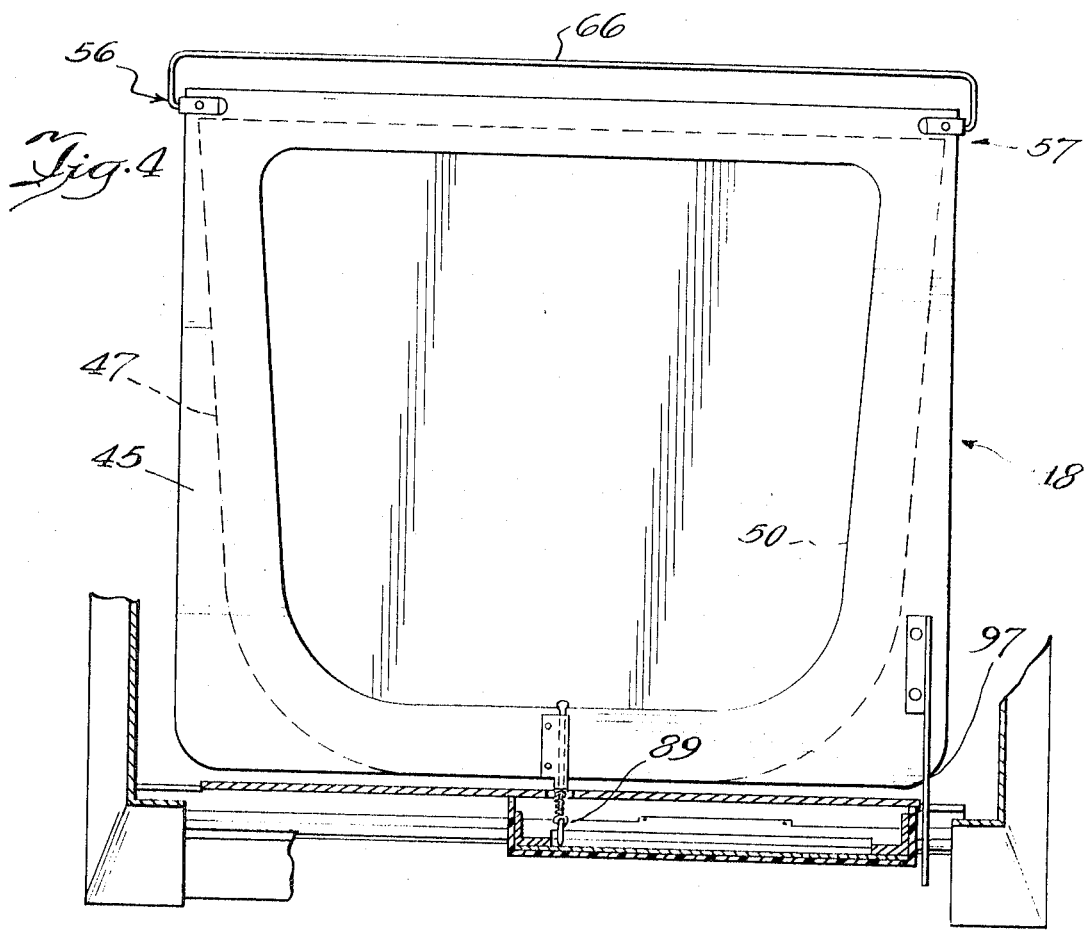
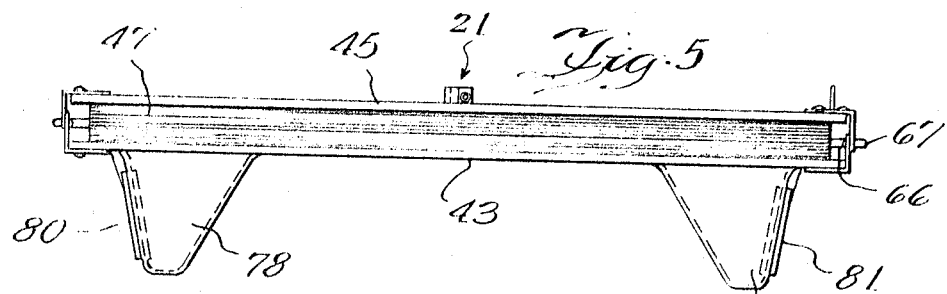
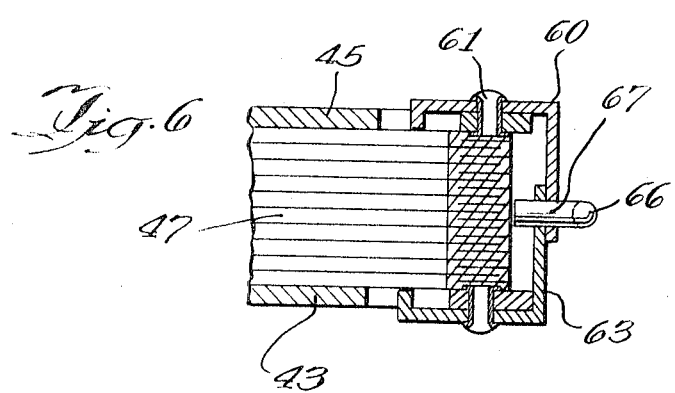

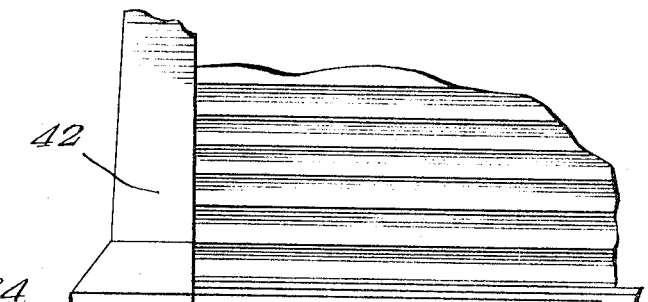
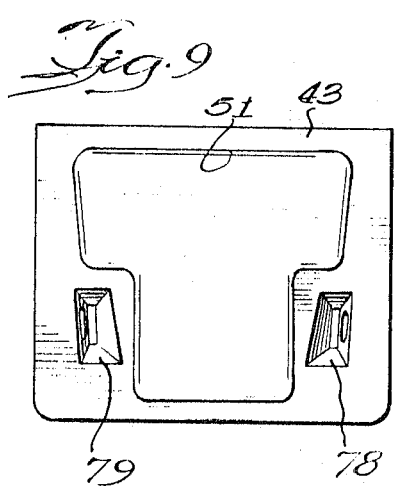
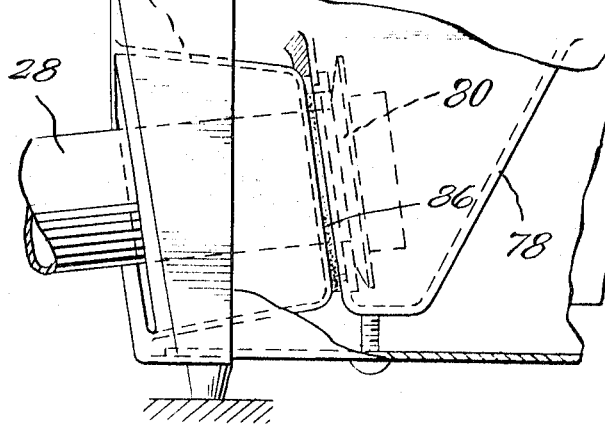
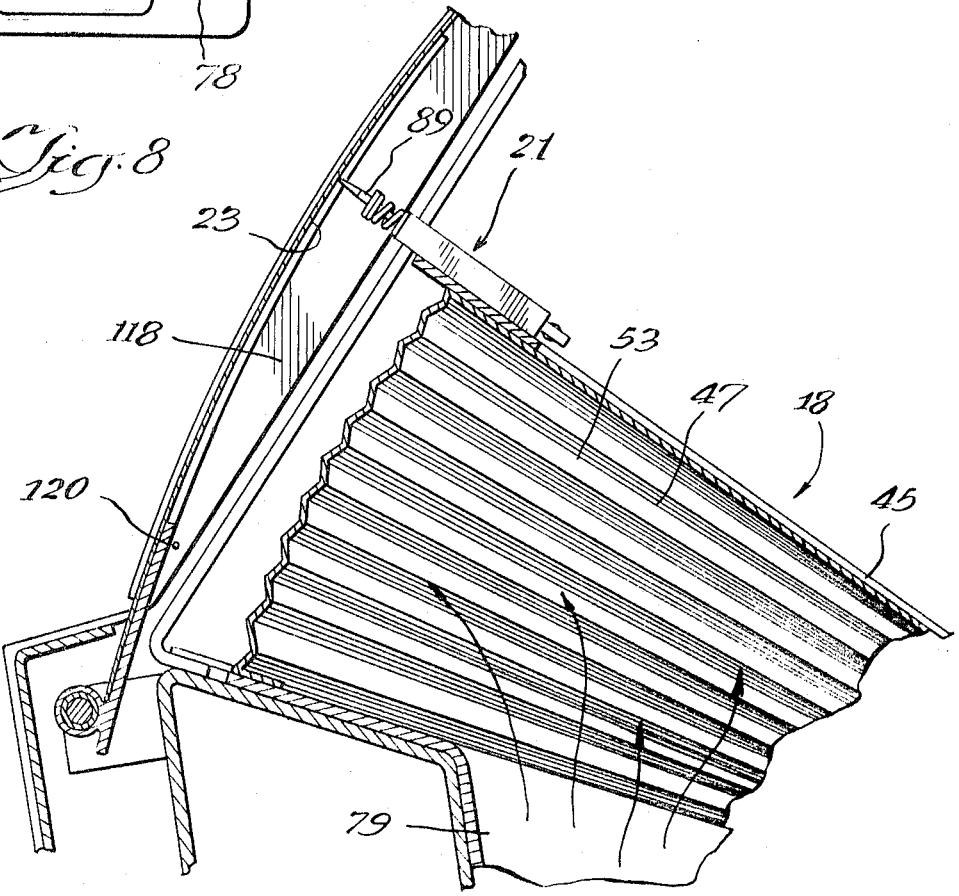

SPIROMETER

BACKGROUND OF THE PRESENT INVENTION

Spirometers are known in the biomedical field to be devices which record a tracing, referred to as a spirogram, of a patient's expiratory cycle during breath exhalation in terms of volume per unit time. One prior device of this character includes a bellows assembly, having a pair of walls, one upper and one lower wall hinged together along their forward edges and surroundingly interconnected along their side edges by a flexible material forming a closed chamber adapted to receive the patient's expiratory air. A mouthpiece fitting is provided between the hinged edges and communicating with the interior chamber. The upper wall carries a marking stylus assembly which projects through a slot in a curve plate extending upwardly from the lower wall.

The patient exhales air into a mouthpiece supplying air to the chamber displacing the upper wall an extent representing the volume of air exhaled into the chamber. During this movement of the bellows assembly the marking stylus moves from a reference position in the curve plate slot providing a volumetric indication of the maximal exhaled air.

For the purpose of recording the expiratory cycle a record medium is fed past the marking stylus assembly at a constant speed providing a permanent record of the patient's air volume at every instant during the expiratory cycle.

The resulting spirogram is known to be useful in diagnosing pulmonary diseases such as asthma, common bronchitis, emphysema and others.

Prior spirometers have many disadvantages. One is the difficulty in providing a reference position for the stylus and chart so as to have a repetitive predetermined starting point for superimposed multiple recordings.

Another disadvantage is that the bellow assemblies have been subjected to contamination resulting in cross-infection of patients. They are difficult or impossible to clean and even though attempts to solve the problems have been made, they have been unsuccessful.

SUMMARY OF THE PRESENT INVENTION

In accordance with the present invention, an automatic spirometer assembly is provided including a removable bellows assembly that positions a marking stylus vertically in accordance with air being delivered to the bellows assembly, and a reciprocating carriage that adjusts and holds a pressure sensitive spirogram record in a manner that permits the marking stylus to trace on one side of the record while at the same time the spirogram tracing can be viewed on the other side through a transparent cover without the visual interference of the stylus assembly. The record can be quickly and easily removed and replaced with the new record dropping into accurately aligned position without minute adjustments.

A bellows assembly is provided that is for hygienic reasons removable as a unit from the spirometer housing wherein it is cleaned and replaced for further use.

In order to permit a mouthpiece connected flexible conduit to be received at either side of the spirometer, selectively, the removable bellows assembly is provided with opposed inlet fittings projecting from the lower side of each end thereof.

To insure proper coordination between the record carriage drive and movement of the stylus assembly responsive to the air being delivered to the bellows, a control circuit is provided that responds to a very small vertical movement of the stylus assembly, or the upper portion of the bellows assembly which carries the stylus to initiate the carriage drive. This greatly facilitates reading and interpretation of the spirogram tracing.

Other features of the present device are explained in more detail below.

BRIEF DESCRIPTION OF THE DRAWINGS

FIG. 1 is a plan view of the present spirometer;

FIG. 2 is a side view of the spirometer shown in FIG. 1, partly broken away;

FIG. 2a is a fragmentary view of one bottom rear corner area of the spirometer;

FIG. 3 is a fragmentary top elevation of the spirometer assembly;

FIG. 4 is a sub-assembly plan view of the bellows assembly along with a fragmentary section of the record carriage;

FIG. 5 is a front view of the bellows assembly;

FIG. 6 is a fragmentary section of one of the bellows assembly hinges;

FIG. 7 is a fragmentary view of one corner of the spirometer showing the fittings for receiving the air conduit;

FIG. 8 is a fragmentary section illustrating the bellows in a partly expanded position;

FIG. 9 is a reduced sub-assembly view of the bottom plate of the bellows assembly;

DETAILED DESCRIPTION OF THE PREFERRED EMBODIMENT

Figure 11:
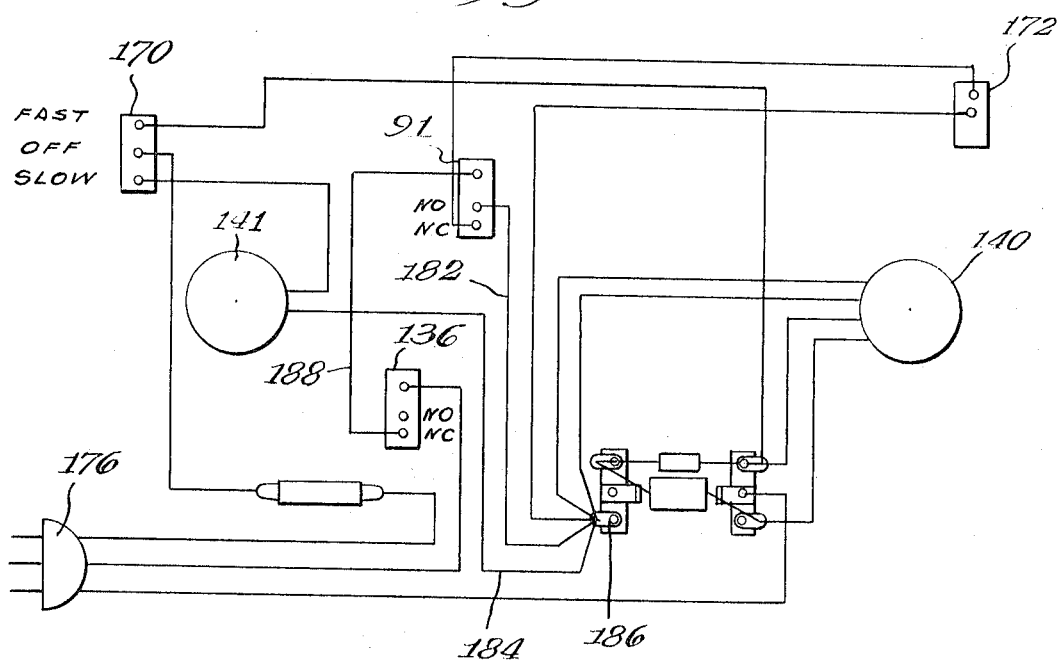
FIG. 11 is a diagrammatic illustration of the present control circuit.

Referring to the drawings and particularly FIGS. 1 and 2, a spirometer apparatus 10 is illustrated generally including a frame assembly 11, a linearly reciprocal carriage assembly 14, an electric drive system 16 and an expandable bellows assembly 18 within the frame 11. Carried by the bellows assembly 18 is a stylus assembly 21 shown in FIGS. 8 and 10 mounted for vertical arcuate movement and having a stylus which engages the backside of a pressure sensitive record illustrated at 23 which provides a tracing on the front side of the record visible through a transparent cover 24 as the carriage moves from its rest position shown in FIG. 1 toward the left during the patient's expiratory cycle. The tracing is a linear plot of the extent of the patient's expiration or inhalation cycle.

A flexible conduit 28 is provided as shown in FIGS. 1 and 7 adapted to be received in either side of the spirometer in communication with the bellows assembly 18, and carries at its other end a mouthpice (not shown) into which the patient breathes forcing air into the bellows assembly which in turn moves the stylus assembly 21 upwardly, causing a control circuit to initiate movement of the carriage assembly 14 to the left scribing at a constant speed a spirogram tracing on record 23.

As seen in FIGS. 1 and 2, the frame assembly 11 includes a main frame member 26 having an inclined portion 27 for supporting the bellows assembly 18, with portion 27 having a U-shaped downward channel 28 extending entirely across the spirometer assembly. Frame member 26 is fixed by suitable fasteners 30 to a bottom housing wall 32. The forward end of the frame 26 has a downwardly extending portion 33 which defines a carriage drive support plate.

Figure 10:
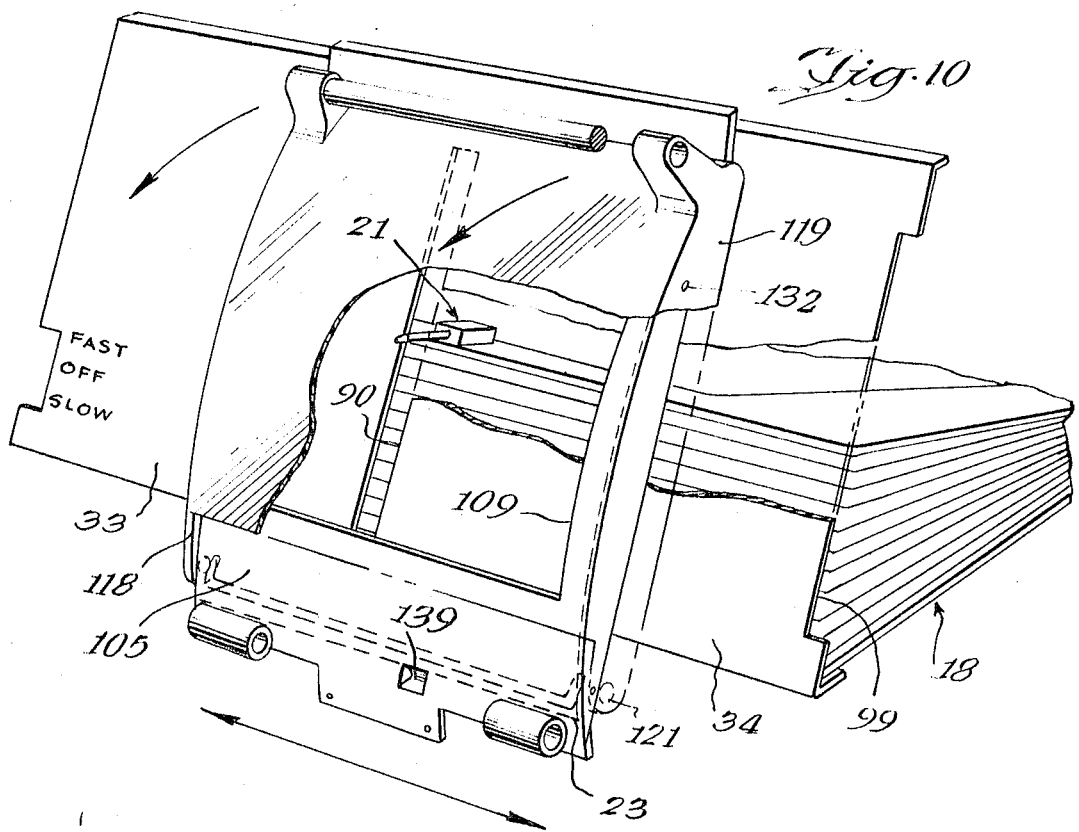
FIG. 10 is a sub-assembly view of the bellows and carriage.

Fixed to the upper surface of the forward end of frame 26 is a rearwardly inclined flat shield having wall portions 33 and 34 spaced as shown in FIG. 10 for receiving a portion of the stylus assembly 21. A top cover plage 38 is fixed to the walls 33 and 34, and supported at its edges by side frame members 40 and 42. A rear housing member 44 is provided and extends between the side frame members 40 and 42. A cut-out portion 39 is provided in the rear member 44 as shown in FIGS. 2 and 2a with the bottom corners spanned as at 41 for a reason to be disclosed hereinafter.

As shown in FIGS. 2, 4 to 6, 8 and 9, the bellows assembly 18 is seen to include a rigid lower plate 43, constructed of a rigid plastic material, an upper plate 45 also constructed of a rigid plastic material, and an accordion pleated flexible plastic expandable bellows 47 bonded to the upper and lower plates. Both the upper and lower plates have recessed portions 50 and 51, respectively, for the purpose of rigidifying the plates. The flexible bellows 47 is bonded to the plates defining a closed chamber 53 therein adapted to receive air and expand the bellows assembly to move the stylus 21 in a vertical direction.

As best seen in FIGS. 2, 4, 5 and 6, the upper plate 45 is hinged to the lower plate 43 at the rear end thereof by hinge assemblies 56 and 57 identical in construction. The hinge assemblies include a bracket 60 fixed to the upper plate by rivets 61 and a bracket 63 fixed to the lower plate 43 in the same manner. The brackets 60 and 63 are pivotally interconnected by a bale or wire member 66 having inwardly extending portions 67 that define hinge pins for the hinge brackets 60 and 63.

The bale 66 serves not only as a carrying handle for the easily removable bellows assembly 18, but also defines a part of a retainer for holding the bellows assembly in position within the housing 11. More specifically, referring to FIGS. 2 and 2a, there is provided in each spanned corner 41 of the rear wall 44 a detent 69 the undersides of which are engaged by the bale 66 when the bellows is in position in the housing. Since the rear portion of frame 27 is cantilever mounted within the housing, it acts as a spring urging the rear end of the bellows assembly upwardly holding bale 66 underneath the detents 69. The forward end of the bellows assembly is retained in position by retaining fingers 72 fixed to inwardly extending projection 74 on wall portions 33 and 34, and extending over the upper surface of the lower bellows assembly plate 43 retaining it in position and preventing upward or forward movement of the lower plate and hence the bellows assembly 18.

The entire bellows assembly 18 may be easily removed from the opening 43 in the rear of the housing by merely urging the rear end of the bellows assembly downwardly releasing bale 66 from projections 69 and raising the bellows assembly by the bale 66 thereby withdrawing the lower bellows plate 43 from underneath the retaining fingers 72 and out the opening 39. Of course, it is understood that the hose connection and plug into the bellows must be disconnected before the bellows can be removed. The reverse procedure is used for inserting the bellows assembly either after cleaning or replacement. It is to be understood that any effective means for pivoting the top and bottom plates of the bellows and for removably securing the bellows in the housing is considered within the scope of this invention.

For the purpose of delivering air to the bellows assembly, the lower plate 43 has hollow projections 78 and 79 extending downwardly therefrom as shown in FIG. 5 and positioned to be received within the channel portion 28 of frame member 26. Each of the hollow projections 78, 79 has an inlet fitting 80 and 81, respectively, either of which may receive the air conduit 28. Thus, the air conduit 28 may be inserted on either side of the spirometer as desired. The side of the bellows not connected to the air conduit is plugged from outside the housing so as to maintain the bellows airtight for use. As shown clearly in FIG. 7, each of the side frames has a cylindrical recessed portion 84 that engages a seal 86 defining a portion of the fittings 80, 81.

As seen best in FIGS. 4 and 10, the bellows assembly 18 extends almost entirely across the interior of the housing assembly 11 and carries the stylus assembly 21 on upper plate 45 approximately centrally thereof. The stylus assembly 21 has a spring biased stylus 89 which projects through slot 90 defined by the space between wall portions 33 and 34. As shown in FIG. 8, the stylus 89 is spring urged into tracing engagement with the pressure sensitive record 23.

As is apparent from the above description, the stylus assembly 21 moves vertically in response to the inflation of the bellows assembly 18 and the arcuate movement distance of the stylus 89 is representative of the volume of air received by the bellows assembly 18. Since the stylus point subscribes a line about a center which is the hinge line of the bellows, the tracing subscribed is a linear plot of the recorded information.

For the purpose of initiating the drive of the carriage assembly 14 and hence the spirometer itself, a micro-switch 91 is provided mounted on a bracket 93 fixed to frame member 26 at the forward end of the bellows. Micro-switch 91 is positioned so that its plunger 95 is in the path of movement of the upper bellows plate 45. That is, the micro-switch 91 is positioned so that the switch is open when the bellows is deflated by engagement with the lower surface of the upper bellows plate 45. Thus, upon a small upward movement of the bellows plate 45, the micro-switch 91 will be closed initiating operation of the carriage drive 16 moving carriage assembly 14 leftwardly immediately after but very close to initiation of the patient's expiratory cycle when air is being delivered to the bellows assembly through one of the inlet fittings 80 or 81. In one operative device actuation was started after 0.004 inch of movement of bellows plate 45 which represents a minimal amount of breath for a patient.

There is also provided a manual control handle 97 fixed to the right side of the upper bellows plate 45 as shown in FIGS. 2 and 4 which projects past the plate 34 forwardly of the housing to permit manual access by the operator. Manual handle 97 reciprocates in slot 99 in plate 34 as shown in FIG. 10. Thus, when it is desired to set a reserve volume in the instrument, the preset volume for initiation of the respiratory cycle is determined and with the switch 170 off, the operator raises the handle 97 to the desired volume, automatically closing switch 91 but there is no power to switch 91 since switch 170 is off. When the desired volume is set and the patient is ready to breathe into or out of the instrument, the switch 170 is closed to the desired speed setting and the member 97 is released whereupon the normal plotting of the record proceeds.

The carriage assembly 14 holds the pressure sensitive paper or record 23 in a position fully justified both horizontally and vertically and drives the record in linear translatory motion past stylus 89 while in engagement therewith. As seen in FIGS. 1 and 2, the carriage assembly 14 includes a stationary guide rod 101 supported by L-shaped brackets 102 and 103 fixed to the front drive panel frame member 33.

Slidably mounted on the guide rod 101 is an arcuate frame 105 having horizontal bearing receiving bosses 106 and 107 at the lower end thereof slidably received on the guide rod 101. As seen in FIGS. 8 and 10, the bearing bosses 106 and 107 also serve the function of vertically positioning the record 23. There is a rectangular cut-out portion or window 109 in the frame 105 exposing a major portion of the rear surface of the record to the stylus 89, it being understood that the record 23 is placed on top of the frame 105 with portions of the record extending peripherally beyond the cut-out 109.

The upper portion of the window frame 105 has projections 112 thereon which slidably engage the plate portions 33 and 34 and thus the latter assist in supporting the carriage assembly due to the rearward tilt of the frame member 105. The frame member 105 is arcuate in configuration so that the record is arcuate with its axis coinciding with the axis about which the top and bottom plates of the bellows pivot, such as at the axis of the hinge pins 67. The curvature of the chart and its relationship with the pivot axis of the bellows gives a linear relationship between the graduations on the chart and the actual volume of the bellows. The linear plot or record is easier to interpret and generally more accurate to use.

For the purpose of horizontally justifying the record 23 on the frame 105 and for the purpose of providing a backing for the record during impression by the stylus 89, a transparent arcuate cover 116 is provided for frame 105. The transparent cover 116 may be constructed of plastic and has downwardly depending side flanges 118 and 119 pivotally connected to the sides of the frame member 105 by suitable pivots 120 and 121. Formed integrally with the upper end of the arcuate cover 116 are handle bosses 123 which support a horizontal handle rod 125.

When the operator desires to load the spirometer with a pressure sensitive record, the handle 25 is pulled outwardly pivoting cover 116 away from the frame member. A record is then inserted on the frame 105 until the bottom edge thereof engages the tops of the bosses 106 and 107 and the side edges thereof are approximately aligned with the sides of the frame 105. The operator then closes the cover 116 and the side flanges of the cover 118, 119 serve to horizontally justify the record 23 providing an accurate reference point 130, FIG. 1, of the stylus with respect to the record. Suitable detents 132 are provided in the depending flanges of the cover 116 as shown in FIG. 2 for the purpose of maintaining the cover in a closed position and holding the record firmly against the frame 105.

Thus, the stylus 89 engages the rear side of the record 23, but since the record 23 is pressure sensitive a tracing will be provided on the front side of the record viewable through the transparent cover 116 from the front of the spirometer. It will be seen from viewing FIG. 1 that while the carriage assembly 14 moves from right to left during the expiratory cycle, tracing 134 will be drawn from left to right on the record 23 when viewed from the front of the spirometer.

A suitable stop is provided (not shown) for limiting the rightward movement of the carriage assembly 14 and thus locating the initial or reference position of the carriage. To stop the carriage drive when the carriage 14 reaches its left position a limit switch 136 is provided as shown in FIGS. 1 and 2 fixed to the front panel frame 33. Limit switch 136 is positioned in the path of an integral rearward projection 139 formed in the central lower portion of the frame 105. Thus, when the carriage 14 reaches its end of stroke, limit switch 136 will be opened, deenergizing the carriage drive 16.

The carriage drive assembly 16 is basically a cable drive selectively driven by either a high speed motor 140 or a low speed motor 141. The motors 140 and 141 are fixed to the rear side of the frame member 33. Each of the motors has a drive shaft 145, 146 which receives a pulley 147, 148. The pulleys 147, 148 drive a cable 150 that is fixed to a lower depending projection 152 on carriage frame 105. Spring 153 is provided in series with the cable 150 for the purpose of properly tensioning the cable.

Each of the motors 140 and 141 is provided with a slip clutch for the purpose of permitting the selective energization of the motors and also to permit the carriage assembly 14 to be manually returned to the reference position shown in FIG. 1.

An opening 156 is provided in the top cover 38 as shown in FIG. 3, for the purpose of providing access to the interior of the housing to store the air hose 28 when not in use. Opening 156 is surrounded by separate plastic fitting 158. Cover 38 also has a handle assembly 160 to facilitate manual transport of the spirometer 10.

The control circuit for the present spirometer is shown in FIG. 11 and is seen to include a power and speed selector switch 170 movable selectively from an off position to either a fast position, energizing motor 140 which is, for instance, a 10 rpm motor, or to a slow position, energizing a motor 141 which is, for instance, a 1 rpm motor. The purpose of the selectivity of either a relatively fast motor or a relatively slow motor is to permit either one respiratory cycle for each reciprocation of carriage assembly 14 or for providing a plurality of respiratory cycles for each reciprocation of the carriage. More specifically, if only one respiratory cycle is desired to be recorded, the switch 170 is placed in its fast mode energizing the faster speed motor whereas if a plurality of respiratory cycles are to be recorded, switch 170 is placed in its slow speed position, energizing the slow speed motor 141. Switch 170 is mounted on the side frame member 40 as shown in FIG. 1.

Mounted in the right side frame member and viewable from the front of the spirometer is an indicating lamp 172 as shown in FIGS. 1 and 2 as well as in the circuit shown in FIG. 11. The indicating lamp 172 is lit whenever the spirometer is ready to receive the patient's air and record a respiratory cycle.

With the carriage assembly 14 in its reference position shown in FIG. 1 with the micro-switch 91 open, current will be supplied to the indicating lamp 172 through limit switch 136, which is a normally closed switch, and through micro-switch 91 which has normally closed contacts for light 172, then opened by the bellows upper plate 45.

With the carriage assembly 14 in the reference position shown in FIG. 1 and with switch 170 moved to the slow position, the patient may begin breathing through conduit 28 causing initially a very small expansion of the bellows assembly 18. This immediately opens the micro-switch 91, turning off the indicating lamp 172, and closes additional normally closed contacts that energize line 182 and 184 through terminal 186, initiating operation of slow speed motor 141.

The carriage assembly 14 stops either when the patient's expiratory cycle has ended, as represented by collapsing of the bellows assembly 18 and closure of micro-switch 91, or by the engagement of projection 139 with limit switch 136 opening the normally closed switch deactivating line 188 and hence drive motor 141.

If high speed carriage motion is desired, switch 170 is placed in its upper position and with switch 91 open and carriage 14 away from the limit switch 136, the ready lamp 172 will again be lit. The patient may then exhale into conduit 28 expanding the bellows thereby shorting around micro-switch 91 for energizing high speed motor 140.

It should be noted that the carriage 14 will continue to move to its left limit position until stopped either by the termination of an expiratory cycle or by the closure of limit switch 136. The carriage assembly is returned manually to its reference position shown in FIG. 1, which is permitted by the slip clutches described above (associated with the motors 140 and 141). It should be noted that when the carriage 14 is stopped because of the actuation of limit switch 136, the bellows is moved to its fully collapsed position opening micro-switch 91 whereby the carriage can be manually returned to its reference position.

It should also be understood that the limit of travel of the carriage 14 to the right is defined by a mechanical stop. Thus, the stylus 89 may move to a zero or reference point 130 when the carriage is in reference position which permits repeated overlapping recordings, all starting from the same point. Of course, if desired, the carriage may be shifted anywhere and the recording started any time on the time base or horizontal scale of the record as desired.

It should be further noted that the ready light 172 cannot be lit if the limit switch 136 is actuated so that there is no indication of readiness when the carriage 14 is at its limit of travel.

We claim:

1. A spirometer, comprising: frame means, a bellows assembly removably mounted in said frame means, means in communication with said bellows adapted for conducting gases thereinto, said recording means associated with said bellows assembly, frame means including a generally vertical frame member, said bellows assembly including a bottom plate, a top plate pivotally secured with respect to said bottom plate, hinge means for said plates, and easily releasable, resilient means biassing said bellows into engagement with said frame.

2. A spirometer as defined in claim 1 wherein said last named means is carried by said hinge means and engages with means on said frame means for releasably holding said bellows in said frame.

3. A spirometer as defined in claim 2 wherein said generally vertical frame member has means against which the bellows securing means reacts for holding said bellows means in said frame.

4. A spirometer assembly, comprising: frame means, a marking assembly movably mounted relative to said frame means, air expandable means for controlling movement of said marking assembly, means in communication with said air expandable means adapted for conducting gases thereinto, a record receiving assembly means for holding a record in cooperating relation to said marking assembly, said record having a rear marking surface against which said marking assembly bears, a transparent cover carried by said record receiving assembly means for holding and backing said record in position for marking while allowing viewing of the record during marking.

5. A spirometer as defined in claim 4 wherein said cover is pivotally secured to said record receiving assembly means.

6. A spirometer as defined in claim 4 wherein one of said record receiving assembly means and said cover includes means for horizontally and vertically aligning said record.

7. A spirometer as defined in claim 4 wherein said record receiving assembly means comprises a portion of a reciprocable record carriage, means for driving said carriage so that the record moves laterally with respect to the marking assembly.

8. A spirometer apparatus, comprising: a housing, frame means within said housing, a marking assembly on said frame means and within said housing, expandable means within said housing for controlling movement of said marking assembly in a first direction, means in communication with said expandable means adapted for conducting gases thereinto, record means cooperable with said marking assembly, said record means being pressure sensitive so that when contacted on one side by said marking assembly a tracing will be visible on the other side, and means for providing relative lateral movement between said marking assembly and said record means such that said record means other side is visible externally of said housing.

9. A spirometer as defined in claim 8 wherein said last named means includes a reciprocable carriage assembly for the record means.

10. A spirometer as defined in claim 8 wherein said carriage assembly includes a window frame against which the record medium is placed, said frame having an opening permitting the marking assembly to engage said one side of the record means, and a transparent cover engaging the other side of the record means through which the tracing on the record may be viewed.

11. A spirometer as defined in claim 10 wherein means are provided for driving said carriage at constant speed relative to said frame means.

12. A spirometer as defined in claim 11 further including means for actuating said driving means upon movement of said expandable means.

13. A spirometer apparatus, comprising: frame means, carriage means reciprocable on said frame means and adapted to secure and carry an arcuately shaped record, a marking means movably mounted relative to said frame means for movement in a direction generally transverse to the direction of movement of said carriage means, actuator means for moving said carriage means, expandable means for moving said marking member in an arcuate path about an axis of said expandable means, means in communication with said expandable means adapted for conducting gases thereinto, and means responsive to movement of said expandable means for initiating operation of said actuator means, said marking means including a marking member for subscribing a linear plot on said record from the rear thereof and providing a tracing visible on the other side of said record.

14. A spirometer comprising: a housing having an access opening; a frame within said housing, said frame having a cantilevered portion adjacent to said access opening; detent means within said housing adjacent said cantilevered portion and fixedly mounted within said housing; a bellows assembly removably mounted on said frame, means in communication with said bellows assembly adapted for conducting gases thereinto, recording means associated with said bellows assembly, said bellows assembly including means engaged with said detent means stationarily holding said bellows assembly within said housing, the inherent resilience of said cantilevered portion serving to urge said bellows assembly into firm engagement with said detent means whereby said bellows assembly will normally be held in a predetermined position within said housing but may be easily removed therefrom through said access opening by moving the bellows assembly against the resilience of said cantilevered portion to disengage said bellows assembly from said detent means.

15. A spirometer according to claim 14 wherein said bellows assembly includes a top plate, a bottom plate and hinge means securing said plates together, said engaging and holding means being carried by said hinge means.

16. A spirometer according to claim 15 wherein said hinge means are defined by a bail, the bight of said bail acting as said engaging and holding means.

17. A spirometer according to claim 16 wherein said detent means comprise at least one projection extending inwardly of said housing.

* * * * *

PO-1050
(5/69)

UNITED STATES PATENT OFFICE
CERTIFICATE OF CORRECTION

Patent No. 3,653,374        Dated April 4, 1972

Inventor(s) Daniel A. Talonn, and Marvin D. Stumpf

It is certified that error appears in the above-identified patent and that said Letters Patent are hereby corrected as shown below:

In the Claims, column 6, line 46, delete the word "said" (first occurrence) preceding "recording means" and insert the word "said" in column 6, line 47, after "assembly,".

Signed and sealed this 26th day of December 1972.

(SEAL)
Attest:

EDWARD M. FLETCHER, JR.
Attesting Officer

ROBERT GOTTSCHALK
Commissioner of Patent